Sept. 20, 1927.

J. W. WELSH 1,642,833

SPECTACLE TEMPLE AND METHOD OF MAKING THE SAME

Filed Jan. 22, 1924

Inventor:-
James W. Welsh.
by David Rines
Attorney:-

Patented Sept. 20, 1927.

1,642,833

UNITED STATES PATENT OFFICE.

JAMES W. WELSH, OF PROVIDENCE, RHODE ISLAND, ASSIGNOR TO BAUSCH AND LOMB OPTICAL COMPANY, OF ROCHESTER, NEW YORK, A CORPORATION OF NEW YORK.

SPECTACLE TEMPLE AND METHOD OF MAKING THE SAME.

Application filed January 22, 1924. Serial No. 687,697.

The present invention relates to ophthalmic mountings and methods of making the same, and more particularly to metal-reinforced, non-metallic spectacle temples.

In some types of temples of the above-described character, a metal reinforcing rod, that is enclosed within a non-metallic tube, is supplemented by a separate metal hinge plate that is provided at the forward end of the temple. There is a tendency for the non-metallic tube to break, near the junction between the hinge plate and the reinforcing rod, into two parts, one containing the reinforcing rod and the other the hinge plate. This is particularly true where the hinge plate is provided with sharp biting spurs or other elements that bite into the non-metallic material and weaken it. It has therefore been proposed to form the reinforcing rod and the hinge plate in one piece; but this proposal may be too costly, because requiring that the hidden reinforcing rod, which could otherwise be constituted of base metal, must be of the same more valuable metal as the more conspicuous hinge plate. In the more usual case, it is desired to have the reinforcing rod of a light-weight metal, like aluminum, and this metal would not have the strength required of a hinge plate.

It is accordingly an object of the present invention to provide a spectacle temple having a reinforcing rod and a hinge element soldered or otherwise secured together, and that may readily be mounted in place in the non-metallic material.

Figure 1:
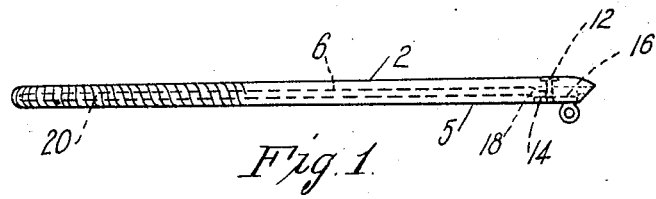
Figure 2:
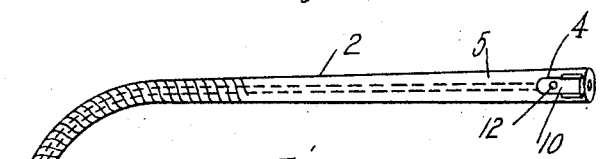
Figure 3:
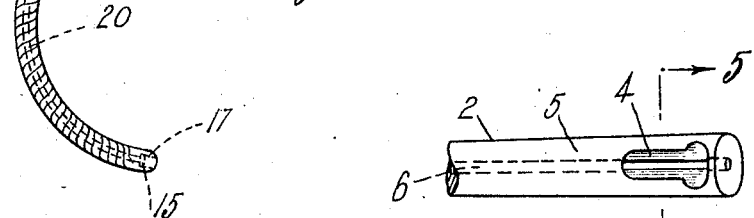
Figure 4:
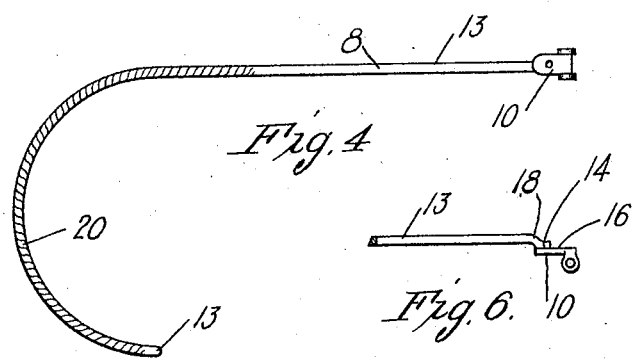
Figure 5:
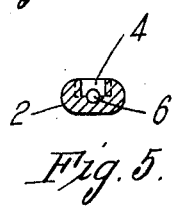
Figure 6:
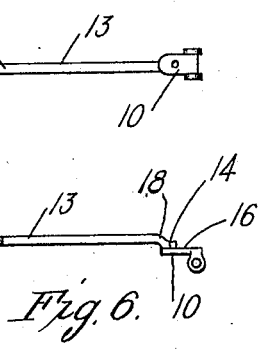
Figure 7:
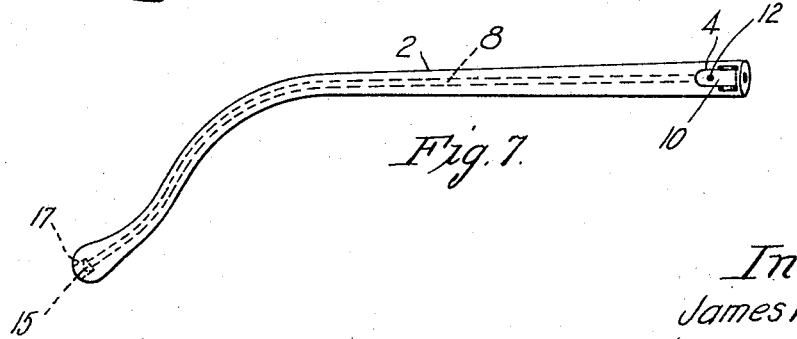

Other objects of the invention will appear from the following description, taken in connection with the accompanying drawings, in which Fig. 1 is a plan of a spectacle temple constructed according to a preferred embodiment of the present invention; Fig. 2 is an elevation of the same: Fig. 3 is a fragmentary elevation of a non-metallic tube, and Fig. 4 is an elevation of a combined reinforcing rod and hinge plate adapted to be united to form a temple such as is illustrated in Figs. 1 and 2; Fig. 5 is a section taken upon the line 5—5 of Fig. 3; Fig. 6 is a fragmentary elevation of the combined reinforcing rod and hinge plate shown in Fig. 4; and Fig. 7 is an elevation corresponding to Fig. 2 of a modification.

The preferred temple of the present invention comprises a non-metallic member, shown as a seamless tube 2, provided at its forward end with a hinge-plate-receiving recess 4, in one face 5, that communicates with the bore 6 of the tube. A reinforcing rod 8, to which a hinge plate 10 is soldered, or otherwise secured, is inserted through the recess 4 and into the bore 6 of the tube 2, the hinge plate 10 being seated in the recess 4. A rivet or screw 12 may be employed to secure the hinge plate 10 to the tube 2. The rear end 13 is then upset, as shown at 15, and the upset portion becomes seated in a recess 17 provided in the extreme rear end of the tube 2. The rear portion of the tube, with the reinforcing rod therein, may be bent into ear-hook shape, as in the case of the cable temple shown in Figs 1 and 2, into the shape of a skull temple, as shown in Fig. 7, or in any other desired temple shape.

The forward portion of the reinforcing rod is shown at 13 as square or polygonal in cross section. This construction provides a flat face 14 of the reinforcing rod to contact with a flat face 16 of the hinge plate, ensuring a secure union when the reinforcing rod and the hinge plate are soldered or otherwise secured together. The extreme forward end of the reinforcing rod is offset at 18, which enables the body of the reinforcing rod to lie in the bore 6, and the hinge plate 10 to lie flush with the face 5 of the tube 2, as is illustrated more particularly in Fig. 1. The polygonal nature of the reinforcing rod enables the rod to bite the more firmly into the walls of the bore 6, which may be softened, prior to the introduction thereinto of the rod, with a suitable solvent, such as acetone. In the case of a cable temple, however, the rear portion 20 of the reinforcing rod should be round, and preferably of the cable type employed in metal cable temples; and the corresponding portion of the non-metallic material mounted on the round portion of the reinforcing rod may be of any desired form, such as a continuation of the tube, but cut helically.

Other modifications also will readily occur to persons skilled in the art, and all such are intended to be included within the spirit and scope of the appended claims.

What is claimed is:

1. A spectacle temple comprising a non-metallic seamless tube having a recess communicating with the bore of the tube, and a reinforcing rod in the bore having a hinge plate secured thereto seated in the recess.

2. A spectacle temple comprising a non-metallic tube having a recess communicating with the bore of the tube, and a reinforcing rod in the bore having a hinge plate seated in the recess, the reinforcing rod and the hinge plate having contacting flat faces along which the reinforcing rod and the hinge plate are secured together.

3. A spectacle temple comprising a non-metallic tube having a recess in one face communicating with the bore of the tube, and a reinforcing rod in the bore having an offset portion and a hinge plate secured to the offset portion lying in the recess flush with the said face of the tube.

4. A spectacle temple comprising a non-metallic tube having a recess in one face communicating with the bore of the tube, and a reinforcing rod in the bore having a hinge plate secured thereto seated in the recess, the portion of the rod adjacent to the hinge plate being of polygonal cross section, and another portion of the rod being flexible and of round cross section, the temple having a coil of non-metallic material mounted on the round portion of the rod.

5. A spectacle temple comprising a non-metallic tube having a recess in one face communicating with the bore of the tube, and a reinforcing rod in the bore having a hinge plate secured thereto mounted in the recess through the said face of the tube.

6. A spectacle temple comprising a non-metallic, seamless tube having a recess in one face communicating with the bore of the tube, and a reinforcing rod in the bore having a hinge plate seated in the recess flush with the said face of the tube, the reinforcing rod and the hinge plate having contacting flat faces along which the reinforcing rod and the hinge plate are secured together.

7. A spectacle temple comprising a non-metallic tube having a recess in one face communicating with the bore of the tube, and a reinforcing rod in the bore having a hinge plate secured thereto lying in the recess flush with the said face of the tube.

8. A spectacle temple comprising a non-metallic, seamless tube having a recess in one face communicating with the bore of the tube, and a reinforcing rod in the bore having a hinge plate secured thereto seated in the recess flush with the said face of the tube, a portion of the rod being flexible, and the temple having a coil of non-metallic material mounted on the flexible portion of the rod.

9. A spectacle temple comprising a non-metal member, and a reinforcing rod in the non-metal member having a separate hinge plate secured thereto, the hinge plate being disposed in the non-metal member and having a knuckle projecting beyond the non-metal member.

10. A spectacle temple comprising a non-metallic tube having a longitudinally disposed bore, and a metal hinge element mounted on the tube, the hinge element having an integral rod extension offset from the hinge element and mounted in the longitudinally disposed bore of the tube.

11. A spectacle temple comprising a non-metallic tube having a recess communicating with the bore of the tube, and a metal hinge plate mounted in the recess, the hinge plate having an integral rod extension mounted in the bore of the tube.

12. A spectacle temple comprising a non-metallic member, a metal hinge element mounted on the non-metallic member, and a member integrally secured to the hinge element in offset relation thereto, the member being secured to the non-metallic member to protect the portion of the non-metallic member near the hinge element from the strains caused by flexing the temple.

In testimony whereof, I have hereunto subscribed my name this 19th day of January, 1924.

JAMES W. WELSH.